though this height need only be sufficiently great to prevent the pots

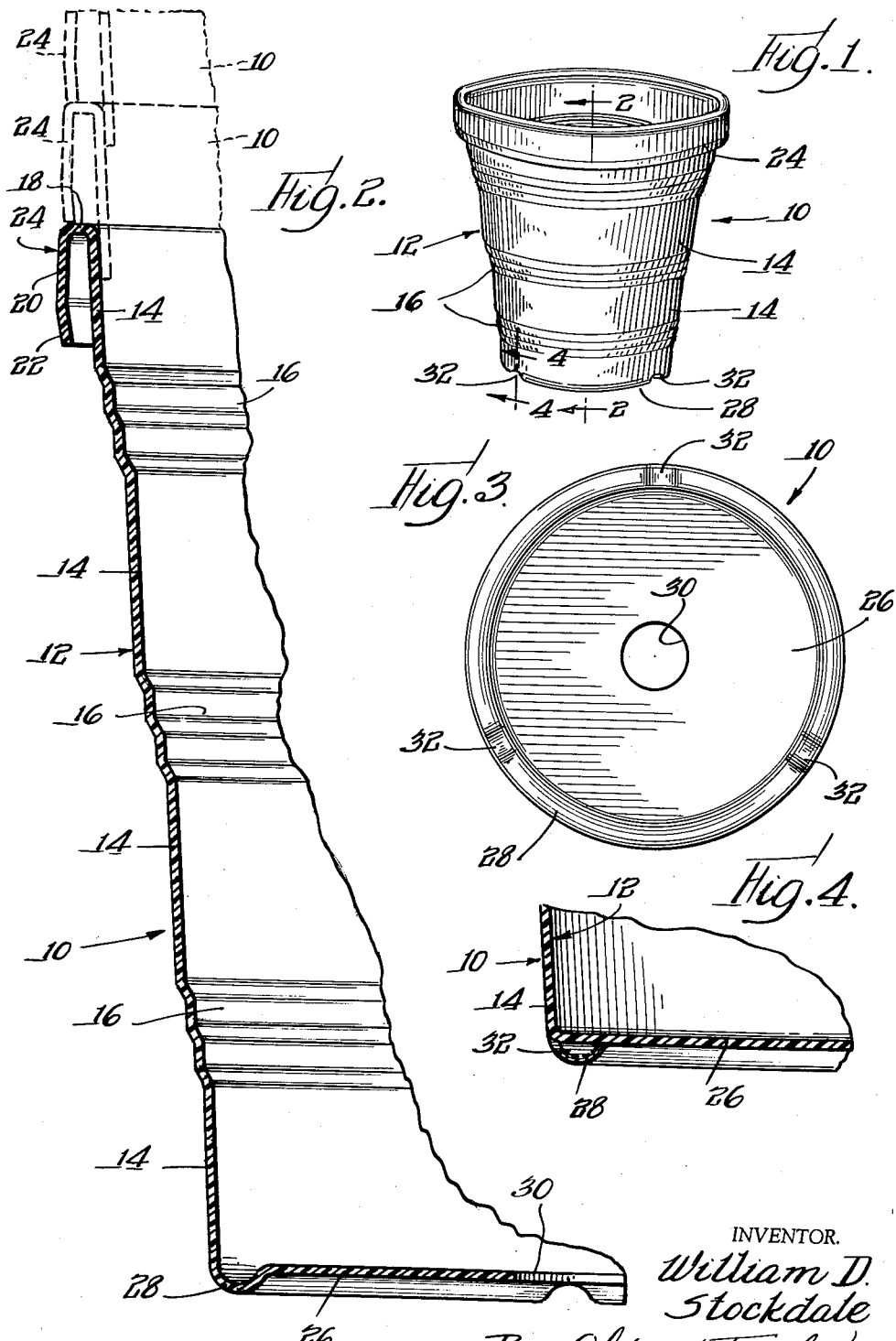

United States Patent Office 3,009,603
Patented Nov. 21, 1961

3,009,603
PLASTIC FLOWER POT
William D. Stockdale, Arlington Heights, Ill., assignor to Illinois Tool Works, Chicago, Ill., a corporation of Illinois
Filed June 16, 1958, Ser. No. 742,223
4 Claims. (Cl. 220—97)

This invention is concerned generally with the art of containers, more particularly with a plastic container such as a flower pot.

Flower pots have certain requirements which in the past have not proven entirely compatible. They must be capable of holding dirt and seeds or seedlings, and a certain amount of water. On the other hand, they must not be completely impervious to the passage of water, as excess water would drown a seed or a seedling. Accordingly, flower pots as heretofore constructed of clay have been more or less waterproof, but have been provided with apertures in the bottoms thereof for excess water to drain off.

Once a seedling has grown to the proper size for transplanting, a flower pot must be capable of being readily removed from the dirt mass and seedling without damage to the dirt mass or the seedling. Therefore, conventional flower pots have been made of a frangible and clay material, whereby the pots could be readily broken away from the dirt mass. However, the frangible characteristic has drawbacks. If a flower pot is dropped accidently, it readily fractures, thereby frequently damaging a dirt mass and seedling therein. Furthermore, flower pots are generally stacked prior to use, and sometimes the stacked flower pots wedge together and break when forcible efforts are made to separate them. Furthermore, clay flower pots are unduly heavy.

Accordingly, it is an object of this invention to provide an improved flower pot having substantially all of the advantages of prior art flower pots and substantially none of the disadvantages thereof.

More particularly, it is an object of this invention to provide a thin walled plastic flower pot.

Another object of this invention is to provide a flower pot which is substantially water proof, thereby avoiding evaporation through the sidewalls thereof, and yet which has provision for adequate drainage and aeration.

It is another object of this invention to provide a flower pot which is readily stacked with like flower pots with no danger of wedging or sticking together of the flower pots.

Other and further objects and advantages of the present invention will be apparent from the following description when taken in connection with the accompanying drawings, wherein:

FIG. 1 is a perspective view of a flower pot embodying the principles of this invention;

FIG. 2 is a vertical sectional view therethrough as taken substantially along the line 2—2 in FIG. 1;

FIG. 3 is a bottom view thereof; and

FIG. 4 is a fragmentary vertical sectional view as taken substantially along the line 4—4 in FIG. 1.

Referring now in greater particularity to the drawings, there will be seen a plastic flower pot designated generally by the numeral 10. The flower pot is preferably made of relatively thin sheet plastic material which is molded in a cavity to final form. Although it is not intended to limit the article disclosed herein to any particular type of plastic, it has been found that polystyrene sheet material is satisfactory. The precise details of the manufacturing process are not of prime importance insofar as this application is concerned.

The plastic flower pot 10 includes a thin plastic sidewall 12 having a plurality of frusto-conical sections 14 successively offset by stepped portions 16. In the illustrative embodiment shown, there are four frusto-conical sections 14, and three stepped portions 16.

The uppermost of the frusto-conical sections 14 is provided with an integral rim comprising a substantially horizontal web 18, and a rather long depending flange 20. An important feature of the rim is that the bottom part of the depending flange 20 is deflected or tucked inwardly as at 22. Due to the inward tucking of the flange section 22, and as clearly may be seen in FIG. 2, the rims in general being indicated at 24, the rims of successive flower pots 10 rests on top of one another with the flower pots in nested relation, whereby to support the flower pots upon one another without wedging together thereof. Accordingly, the flower pots readily can be stacked in nested relation for storage, and conversely, can be readily separated when they are to be used. It will be seen that the axial extent of the flange 20 including the section 22 is substantially greater than the radial offset or spacing thereof from the adjacent sidewall 12, in the illustrative embodiment this is greater than the axial height of one of the stepped sections 16, although it could be less, since this height need only be sufficiently great to prevent the pots from jamming together. The height of the section 22 alone is greater than the radial spacing from the adjacent sidewall, and the offset or tucking of this section is less than half of such spacing.

Further, it has been found that wire supports fit conveniently in the recess formed between the flange and adjacent sidewall of the pot permitting mounting of the pot by such means in a novel and useful manner. Also, where light colored plastic material is used the flange hides the upper extremity of the dirt which forms a distracting line to an observer.

The plastic flower pot 10 is provided with a flat bottom 26 intergral with the sidewall 12 at a downwardly projecting annular ridge 28. The flat bottom 26 is provided with a central aperture 30, to provide for draining excess water from the flower pot, and the annular ridge 28 is interrupted by notches 32 at spaced positions. It will be noted that the apertures 30 cooperate functionally with the rims 24 in that the rims support the flower pots in nested relation to prevent wedging together while the apertures 30 vent the pots to prevent their being held together by air pressure. Preferably, the notches are at equally arcuately spaced intervals, there being three notches in the illustrative embodiment. The notches provide flat or planar continuations of the flat bottom 26, as readily may be seen in FIG. 4. Accordingly, if excess water is applied to the material in the flower pot, as frequently is done in commercial nurseries to avoid any possibility of under watering, the excess water will simply run out through the aperture 30 onto a supporting table or the like, and will pass from beneath the flower pot through the notches 32. Conversely, the notches 32 and aperture 30 provide space for passage of air for proper aeration of the dirt or the like in the flower pot.

The plastic flower pot as now disclosed is quite light in weight, particularly compared with the usual clay pots. The plastic material is tough, and will not readily break. However, like most sheet plastics, once a cut or tear has been started, the material will tear fairly easily. Thus, when it is desired to remove the pot for transplanting, it is only necessary to nip through the rim with a pair of garden shears, or with a knife or the like. The remainder of the flower pot then readily can be torn from the dirt and seedling within the flower pot. Or, since the pot is flexible and conical, the dirt can be loosened and the plant and dirt tapped out. (Like rolling an orange before cutting open to squeeze juice out.) Thus, the thin walled plastic flower pot herein disclosed has the heretofore unrealized, and apparently antithetical qualities of being tough and resistant to damage or destruction by accident, and yet readily torn or broken away from the dirt mass when this is desired.

The inwardly tucked section of the depending rim allows ready stacking or nesting of a series of flower pots without the danger of the flower pots wedging together. Furthermore, the weight of the flower pots eliminates one of the major tendencies for the flower pots to wedge together.

The plastic sheet material of which the flower pot is formed is substantially impervious to water. Accordingly, there is no tendency for moisture evaporation through the sidewalls of the flower pot, as is the case with the relatively permeable or porous clay flower pots now in general use. Thus, seedlings or the like in the flower pot herein disclosed need not be watered as often as seedlings in the pervious clay pots. On the other hand, the aperture in the bottom wall, combined with the notches in the base or supporting rim, provides adequate drainage for excess water, and also provides for aeration of the dirt or the like in the flower pot.

The attractive appearance of the flower pot, as engendered by the smooth and lustrous surface of the plastic, and by the wide arcuate feet provided by the rim 28 between notches, is a bonus feature making the plastic flower pot more esthetic to use. The plastic flower pot as herein disclosed is remarkably easy to handle, both because of its inherent light weight, and because of the stepped portions 16 of the sidewall which make gripping of the flower pot by the fingers a simple matter. The stepped portions furthermore impart a desirable rigidity to the flower pot, thereby preventing inadvertent temporary deformation of the sidewalls by finger pressure as the flower pot is lifted.

It will be appreciated that the specific embodiment of the invention as herein shown and described is for exemplary purposes only. Various changes in structure will no doubt occur to those skilled in the art, and will be understood as forming a part of the invention insofar as they fall within the spirit and scope of the appended claims.

The invention is claimed as follows:

1. A unitary container formed from plastic sheet material of substantially uniform thickness and comprising a bottom wall, said sidewall means integral with and upstanding from the bottom wall, and a rim integral with said sidewall means at the top edge thereof and including a radially outwardly extending flange and an axially extending elongated flange depending from the outer edge of said radially extending flange, the lower edge of said depending flange being spaced outwardly from the adjacent sidewall means with the diameter thereof less than the major diameter of said radially extending flange whereby the lower edge of the axially extending flange will rest on the radially extending flange of an adjacently nested container, said sidewall means including a plurality of sections of successively smaller diameter from the top to the bottom of the container and said sections being separated by clusters of annular shoulders of successively smaller diameter for strengthening the side wall means, the uppermost cluster of annular shoulders being located adjacent the free edge of the axially depending flange for strengthening the top portion of the container to resist deformation thereof during handling.

2. A unitary container as set forth in claim 1, wherein the sidewalls are integrally joined to the bottom by a downwardly projecting curvilinear ridge of uniform thickness throughout so as to present a substantially line contact surface for engagement with a support.

3. A unitary container as set forth in claim 1, wherein the lower edge of said depending flange extends radially inwardly from the major diameter of said radial flange a distance less than one half of the radial extent of said radial flange.

4. A unitary container as set forth in claim 1, wherein the axial length of the depending flange is greater than the radial extent of said radial flange.

References Cited in the file of this patent

UNITED STATES PATENTS

| 1,710,878 | Keiso | Apr. 30, 1929 |
| 2,563,352 | Morse | Aug. 7, 1951 |
| 2,602,568 | Kinney | July 8, 1952 |
| 2,859,557 | Lattuca | Nov. 11, 1958 |

FOREIGN PATENTS

| 15,499 | Germany | July 5, 1956 |